United States Patent [19]

DiMaria

[11] 4,174,175
[45] Nov. 13, 1979

[54] COPY PREVIEW APPARATUS

[76] Inventor: James D. DiMaria, 11879 St. Trinians Ct., Reston, Va. 22314

[21] Appl. No.: 874,251

[22] Filed: Feb. 1, 1978

Related U.S. Application Data

[63] Continuation-in-part of Ser. No. 790,024, Apr. 22, 1977, abandoned.

[51] Int. Cl.² ............................................. G03G 15/00
[52] U.S. Cl. .......................................... 355/44; 355/5; 355/11
[58] Field of Search ........................ 355/5, 11, 43–45, 355/47–49, 66

[56] References Cited

U.S. PATENT DOCUMENTS

| Re. 29,406 | 9/1977 | Arnott | 355/75 X |
|---|---|---|---|
| 3,697,176 | 10/1972 | Keuhnle et al. | 355/5 X |
| 3,973,846 | 8/1976 | Sullivan et al. | 355/3 R |

*Primary Examiner*—R. L. Moses

*Attorney, Agent, or Firm*—Burns, Doane, Swecker & Mathis

[57] ABSTRACT

An apparatus for previewing original positive documents and for copying the previewed documents in substantially exactly the same form as previewed with a xerographic or electrostatic copier. The positive document to be copied is placed on a transparent surface such as the glass plate of a conventional copier and is illuminated through the plate to produce an image that can be previewed and copied. In one embodiment, the previewer and copier optics are arranged so that either previewing or copying can be selectively accomplished at the same document receiving station. In another embodiment, the apparatus includes a previewing station including a screen and means for projecting documents being previewed on the screen. Documents to be copied are transferred to a copy station by a belt (e.g. a transparent belt) wherein it is copied such as by an electrostatic copying apparatus.

5 Claims, 3 Drawing Figures

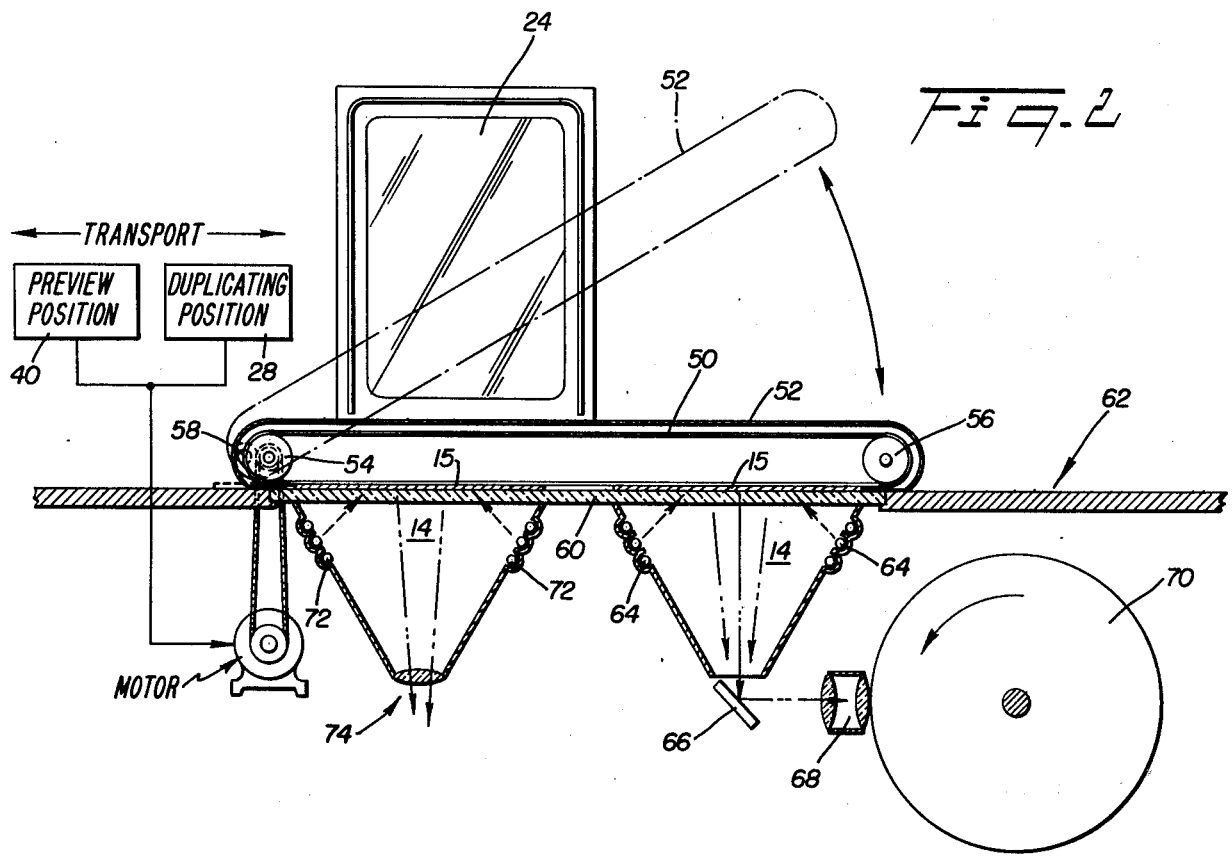
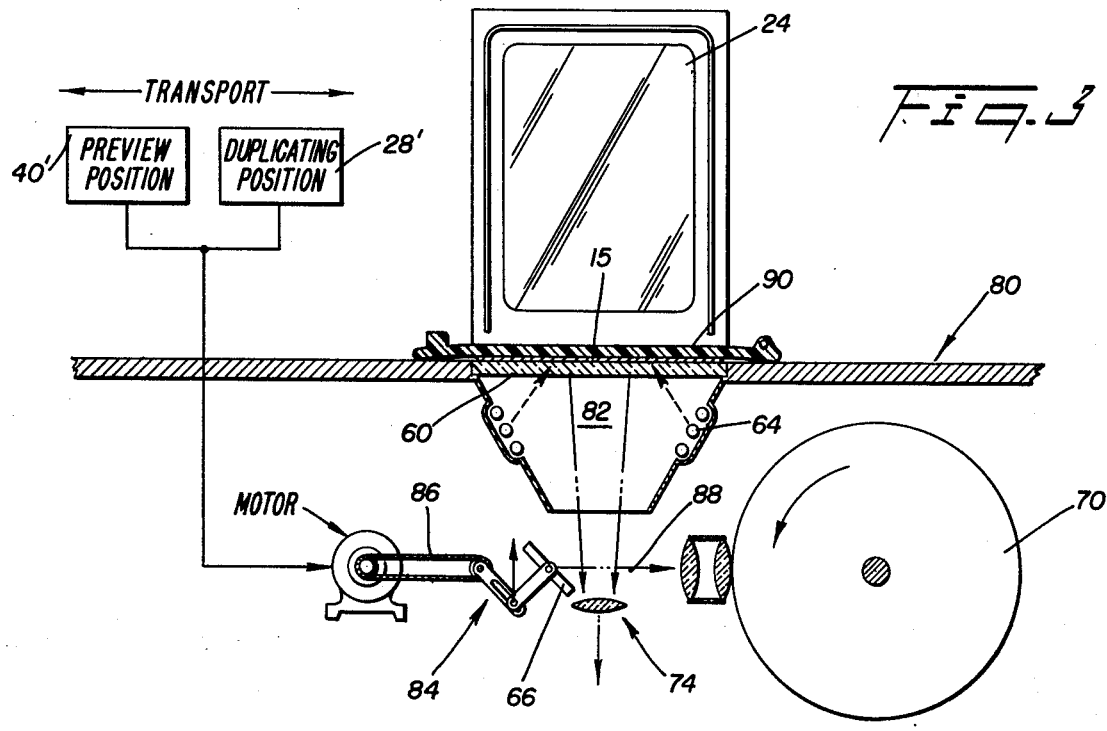

COPY PREVIEW APPARATUS

RELATED APPLICATIONS

This application is a continuation-in-part of copending U.S. patent application Ser. No. 790,024 Apr. 22, 1977, now abandoned of James D. Dimaria.

BACKGROUND OF THE INVENTION

This invention relates to an apparatus for copying documents and for previewing documents to be copied.

Often with a conventional electrostatic or xerographic copier it is desirable to copy only a portion of a document or to arrange multiple documents or portions of documents in a manner different than the arrangement of the original documents. The documents or portions thereof are often assembled loosely and placed under the cover plate of the copier. It is almost impossible to tell exactly how such an assemblage will look when copied without actually making a copy. If it is then found that the assemblage is not as desired, it must be rearranged and another copy produced. This procedure is not only wasteful of paper but also is wasteful of operator time and ties up the copying machine.

Various techniques have been suggested for permitting an operator to view frames of microfilm or other film images before a copy is produced from the film. Examples of such techniques may be seen in U.S. Pat. Nos. 3,262,557 of Cunningham et al, 3,369,449 of Klauss et al, 3,898,002 of Kinder et al, and other patents cited in connection with U.S. patent application Ser. No. 790,024 of James Dimaria.

It can be seen that none of the foregoing patents addresses the problems set forth above. The fact is that it is quite common to provide viewers for film strips for copying purposes because such film strips are difficult or impossible to view without some mechanical viewing aid. It will thus be appreciated that the necessity of having such viewers for film strips has not suggested any answers to the problem presented with regard to the copying of positive documents on a conventional xerographic or "office" copier.

OBJECTS AND BRIEF SUMMARY OF THE INVENTION

It is an object of this invention to provide an apparatus for previewing and copying documents, wherein the operator can preview the document exactly as it will appear in a copy prior to the copy being made by conventional xerographic techniques.

It is a further object of the present invention to provide a novel apparatus for xerographic copying of positive documents wherein a document to be copied may be first previewed at a previewing station and then copied in the exact previewed form at a copying station.

Further objects and advantages of this invention will become evident to one skilled in the art to which the invention pertains in view of the following detailed disclosure when read in conjunction with the appended drawings.

In accordance with this invention an apparatus is provided for previewing a positive document prior to copying the document by conventional xerographic means. In one embodiment of the invention there is a document previewing station and a document copying station displaced therefrom. The document previewing station includes means for positioning the document or documents and for projecting the positioned documents on to a viewing screen. The previewed documents which are to be copied are transported to the copying station and are electrostatically copied by conventional means. The documents are transported between the previewing station and the copying stations by a transparent material which permits previewing and copying at the respective stations or by a belt overlying the document and holding the document against a transparent surface through which the document can be previewed or copied.

According to another embodiment of the invention, the positive side of the document to be duplicated is placed in contact with a transparent surface through which a copy can be made by a conventional electrostatic technique. An image of the document can be projected through optics beneath the transparent surface onto a viewing screen or other suitable display in response to operator initiation of a preview mode. A copy of the document, substantially as displayed, can be made by conventional electrostatic techniques through the transparent surface in response to operator initiation of a copy mode.

BRIEF DESCRIPTION OF THE DRAWINGS

FIG. 2 is a view in elevation and in crosssection of another embodiment of an apparatus according to the present invention; and, FIG. 3 is a view in elevation and in crosssection of yet another embodiment of an apparatus according to the present invention.

DETAILED DESCRIPTION OF THE PREFERRED EMBODIMENT

Figure 1:
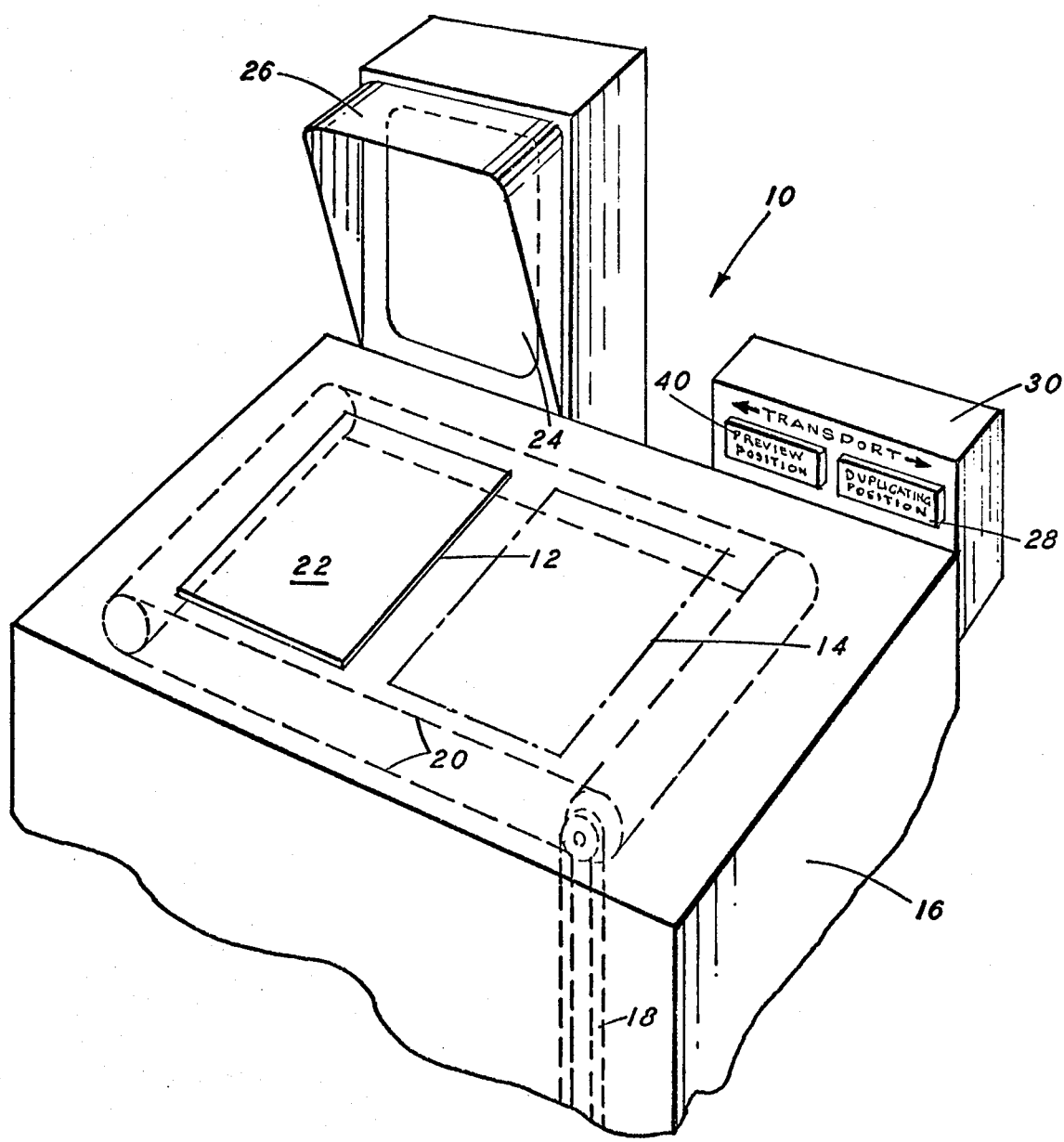
FIG. 1 is a perspective view of one embodiment of an apparatus according to the invention.

Referring the FIG. 1, a copying apparatus 10 includes a previewing station 12 and a copying station 14. The apparatus 10 includes a housing 16 for enclosing a conventional electrostatic copying means (not shown) and a motor (not shown) for driving an endless belt 18. The documents to be previewed are placed on transparent endless belt 20 at station 12 and a hinged cover 22 is placed over the positioned documents. Conventional means (not shown) project the documents at station 12 onto screen 24 which is provided with ambient light shield 26. When it is desired to copy the previewed documents, indication bar 28 is actuated on control means 30 to actuate endless belt 18 to rotate cylinder 32 and thereby moving belt 20 to position the previewed documents at station 14. At station 14, the documents are copied by conventional electrostatic means in housing 16. Control means 30 also is provided with indicator bar 40 to activate endless belt 18 and transparent endless belt 20 to position documents for previewing at position 12.

FIG. 2 illustrates an embodiment of the invention similar to that shown in FIG. 1 except that the endless belt used to transport the document to be copied from the previewing station 12 to the copying station 14 is not transparent and overlies the document (as is shown in both positions 12 and 14 and designated by the numeral 15). Specifically, an endless belt 50 is mounted in a housing 52 that contains rotatably mounted roller cylinders 54 and 56. The housing 52 is hinged at one end 58 so that the housing and belt can be pivoted into and out of contact with a transparent document receiving surface 60 of a copying machine 62 (such as the one discussed in connection with FIG. 1).

The copying station is completely conventional and includes lights 64 that illuminate the document 15 through the transparent surface 60 (e.g., a glass plate). The light reflected from the document 15 strikes an image scanning mirror 66 that is typically mounted for pivotal movement to scan the document and reflect light onto an optical system 68. The light passing through the optical system 68 is typically focused onto a revolving drum 70 of selenium or other material that stores and ultimately reproduces the document by electrostatic techniques.

A similar optical arrangement may be utilized at the previewing station to project the image of the document 15 onto the viewing screen 24 for display prior to copying. Of course, the optical system need not be as complex as that used at the copying station since accurate scanning, precise optical focusing and the like are not required. Therefore, any suitable illumination system 72 and optics 74 including mirrors and other reflectors (not shown) may be used to project the image of the document at the previewing station 12 to the viewing screen 24 as was previously mentioned in connection with FIG. 1.

FIG. 3 illustrates another form of the invention wherein the previewing and duplicating stations 12 and 14 are at one location and selection is made between previewing and copying by means other than transporting the document 15 from one location to another. Referring to FIG. 3, the xerographic or electrostatic copying machine 80 is preferably identical to any suitable conventional copying machine with a single document receiving station 82 except that the optical system for effecting the copying procedure is arranged so that both previewing on a display such as the screen 24 and copying are selectable with a single document receiving station.

As is shown in FIG. 3, for example (wherein elements similar to those previously described have like numerical designations), the scanning mirror 66 is mounted on a mechanism 84 that moves as indicated in response to rotation of the belt 86 by the motor in order to move the mirror 66 along a horizontal path 88 between a retracted, previewing position (illustrated) and an extended, copying position (e.g. that shown in FIG. 2). Thus, the positive document 15 may be placed on the transparent surface 60 at the document receiving station 82 and a suitable hinged cover 90 may be closed. With the "preview" button 40' depressed, the scanning mirror will be positioned as illustrated and the lights 64 illuminated. The light reflected from the document 15 will pass through the previewing optics 74, be reflected off the mirrors therein and properly focused on the screen 24, so that an image of the document substantially exactly as it will be copied, will be projected onto the screen 24. With the "duplicate" button depressed, the motor will extend the mechanism 84 to move the scanning mirror 66 into its normal copying position, after which a xerographic copy will be produced in a conventional manner.

The present invention may be embodied in other specific forms without departing from the spirit or essential characteristics thereof. The presently disclosed exemplary embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. Apparatus for previewing and copying documents in a positive form comprising:
    means for projecting the image of a document on a viewing surface at a previewing station to display an image of the document for viewing prior to copying;
    means for transporting the viewed document from said previewing station to a copying station, the transporting means including a transparent endless belt having a surface in contact with a surface of the document, and means for moving the belt with the document in contact therewith between the previewing station and the copying station; and
    means for copying the document at said copying station in the same form that the document was viewed at the previewing station.

2. The apparatus of claim 1 wherein said belt moving means comprises hand actuated means for rotating said endless belt to position a document from said previewing station to said copying station.

3. The apparatus of claim 2 wherein said transparent endless belt is actuated by a motor driven endless belt connected to a roller which supports the transparent endless belt.

4. Apparatus for previewing and copying positive documents comprising:
    a document receiving station including a transparent surface and means for illuminating a surface of a positive document to be copied through said transparent surface;
    means for selectively projecting the image of the illuminated document through the transparent surface and on to a viewing surface to display an image of the document for viewing prior to copying;
    means for selectively copying the positive document through the transparent surface in substantially the exact form that the document is displayed on the viewing surface;
    said selective projecting means and said selective copying means being at spaced locations and said apparatus including transporting means for moving the document from the location of the projecting means to the location of the copying means.

5. The apparatus of claim 4 wherein said transparent surface comprises a substantially horizontally disposed glass plate, the surface of the document to be copied being in contact with one surface of the glass plate and the glass plate being disposed intermediate the surface of the document to be copied and the illuminating means.

* * * * *